US 10,753,313 B2

(12) United States Patent
Okagawa et al.

(10) Patent No.: US 10,753,313 B2
(45) Date of Patent: Aug. 25, 2020

(54) ROTATING PART SUPPORTING STRUCTURE FOR ENGINE

(71) Applicant: MAZDA MOTOR CORPORATION, Hiroshima (JP)

(72) Inventors: Masaaki Okagawa, Kobe (JP); Satoshi Imamura, Hiroshima (JP); Shohei Kimura, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 134 days.

(21) Appl. No.: 15/760,296

(22) PCT Filed: Mar. 10, 2017

(86) PCT No.: PCT/JP2017/009650
§ 371 (c)(1),
(2) Date: Mar. 15, 2018

(87) PCT Pub. No.: WO2017/163921
PCT Pub. Date: Sep. 28, 2017

(65) Prior Publication Data
US 2019/0048823 A1 Feb. 14, 2019

(30) Foreign Application Priority Data

Mar. 25, 2016 (JP) ................. 2016-062611

(51) Int. Cl.
*F02F 7/00* (2006.01)
*F16C 9/02* (2006.01)
(Continued)

(52) U.S. Cl.
CPC ........... *F02F 7/0053* (2013.01); *F01M 11/02* (2013.01); *F02F 7/0007* (2013.01); *F16C 3/14* (2013.01);
(Continued)

(58) Field of Classification Search
CPC . F01M 11/02; F01M 2011/026; F02F 7/0007; F02F 7/0053; F16C 17/02;
(Continued)

(56) References Cited

U.S. PATENT DOCUMENTS 6,120,187 A 9/2000 Ono et al.
2002/0126924 A1 9/2002 Okamoto et al.
(Continued)

FOREIGN PATENT DOCUMENTS

CN 204591983 U 8/2015
EP 2 581 566 A2 4/2013
(Continued)

OTHER PUBLICATIONS

International Search Report issued in PCT/JP2017/009650; dated May 30, 2017.

*Primary Examiner* — Lindsay M Low
*Assistant Examiner* — Ruben Picon-Feliciano
(74) *Attorney, Agent, or Firm* — Studebaker & Brackett PC

(57) ABSTRACT

Disclosed herein is a support structure for a rotary part of an engine (2). The support structure includes crank journal bearing metals (14) and crank pin bearing metals (24, 124). Each crank journal bearing metal (14) includes chamfers (16) and crowned portions (17). On the other hand, each crank pin bearing metal (24, 124) includes chamfers (26) and no crowned portion or crowned portions (127) on its inner peripheral surface. The crowned portions (127) are inclined at a smaller angle than the crowned portions (17).

3 Claims, 8 Drawing Sheets

(51) Int. Cl.
*F01M 11/02* (2006.01)
*F16C 3/14* (2006.01)
*F16C 33/10* (2006.01)
*F16C 17/02* (2006.01)
*F16C 33/04* (2006.01)
*F16C 3/08* (2006.01)

(52) U.S. Cl.
CPC ............... *F16C 9/02* (2013.01); *F16C 17/02* (2013.01); *F16C 33/1045* (2013.01); *F16C 33/1065* (2013.01); *F16C 33/1085* (2013.01); *F01M 2011/026* (2013.01); *F16C 3/08* (2013.01); *F16C 17/022* (2013.01); *F16C 33/046* (2013.01); *F16C 2360/22* (2013.01)

(58) Field of Classification Search
CPC .. F16C 17/022; F16C 2360/22; F16C 33/046; F16C 33/1045; F16C 33/1065; F16C 33/1085; F16C 3/08; F16C 3/14; F16C 9/02
See application file for complete search history.

(56) References Cited

U.S. PATENT DOCUMENTS

| | | |
|---|---|---|
| 2015/0055901 A1 | 2/2015 | Kawashima et al. |
| 2015/0204377 A1* | 7/2015 | Barbosa De Oliveira Ferreira Salles ............ F16C 9/02 123/197.4 |
| 2017/0152885 A1* | 6/2017 | Kato ............ F01M 11/02 |

FOREIGN PATENT DOCUMENTS

| | | |
|---|---|---|
| GB | 2 354 291 A | 3/2001 |
| JP | H10-299780 A | 11/1998 |
| JP | 2002-227822 A | 8/2002 |
| JP | 2002-266848 A | 9/2002 |
| JP | 2008-151271 A | 7/2008 |
| JP | 2013-245767 A | 12/2013 |
| JP | 2015-064009 A | 4/2015 |

* cited by examiner

ROTATING PART SUPPORTING STRUCTURE FOR ENGINE

TECHNICAL FIELD

The present invention relates to a support structure for a rotary part of an engine.

BACKGROUND ART

Crankshafts each including crank journals, crank pins, and crank arms have been known. Each of the crank journals is supported by a cylinder block and one of bearing caps. Each of the crank pin support the large end part of a connecting rod composed of a connecting rod body and a connecting rod cap. Each of the crank arms connects one of the crank pins to associated ones of the crank journals. Such a crankshaft is disposed in an engine, while being supported by a rotary part support structure for rotatably supporting crank journals and crank pins.

Patent Document 1 describes a rotary part support structure including sliding bearings, a flywheel, a first weight, and a second weight. The sliding bearings are attached to a cylinder block, and rotatably and pivotably support crank journals. The flywheel is connected to an end of a crankshaft, which projects out of the cylinder block. The first weight is attached to the flywheel. The second weight is connected to the other end of the crankshaft inside the cylinder block. Each sliding bearing is composed of a combination of an upper member and a lower member and has a cylindrical shape as a whole. The sliding bearing closest to the flywheel has a crowned portion at the end of a sliding face, which is closer to the first weight. On this sliding face, the upper member slides on the lower member. The crowned portion is a surface inclined so that the diameter of the sliding face increases from the inside toward the outside of the crankshaft.

CITATION LIST

Patent Documents

PATENT DOCUMENT 1: Japanese Unexamined Patent Publication No. 2008-151271

SUMMARY

Technical Problem

In the crankshaft described in Patent Document 1, each of crank pins rotates about the axes of associated ones of the crank journals by reciprocation of a piston connected to the small end part of a connecting rod. On the other hand, each crank journal rotates about its axis, while being supported by the cylinder block and a bearing cap so that the axis does not deviate from a desired position.

In general, a crank pin is connected to a piston via a connecting rod. When the piston descends from the top dead center to the bottom dead center all at once in an explosion stroke of a combustion cycle of an engine, a relatively heavy load is applied to the crank pin. In the application of the load to the crank pin in the explosion stroke, the load is also applied to crank journals via crank arms.

At this time, the load is applied to the crank pin in a direction substantially perpendicular to the crankshaft direction. On the other hand, if crank journals and crank pins are arranged alternately in the crankshaft direction, the load is applied only to the portions of the crank journals, which are connected to the crank pin. Thus, in the application of the load to the crank pin, the portions of the crank journals, which are connected to this crank pin, are inclined downward toward the crank pin.

Assume that a bearing whose inner peripheral surface extends in the crankshaft direction supports one of the crank journals. When inclined downward as described above, the crank journal comes into contact with the corner between an end surface of the bearing in the crankshaft direction and the inner peripheral surface so as to be supported by the corner. In this state, the load is applied to the corner, that is, an excessively high contact pressure is applied to the corner. Since the crank journal is pressed to the corner, the sliding resistance on the crank journal may increase.

In the rotary part support structure described in Patent Document 1, the bearing closest to the flywheel has the crowned portion described above at the end of the sliding face, which is closer to the first weight. The crank journal supported by the bearing including the crowned portion receives the load, while diffusing the load with the crowned portion to reduce the contact pressure of the load. However, no countermeasure is suggested to the other crank journals, which is to be addressed.

In addition, in view of reducing an increase in the sliding resistance in entire crankshafts, attentions are to be paid not only to the bearings of the crank journals but also to the bearings of the associated crank pins.

The present invention was made in view of this problem. It is an objective of the present invention to reduce an increase in the sliding resistance on a crank pin and crank journals in an explosion stroke of a combustion cycle of an engine.

Solution To The Problem

In order to achieve the objective, the present invention provides a support structure for a rotary part of an engine. The structure includes block-side bearing parts in a cylinder block, bearing caps, each associated with one of the block-side bearing parts; a crankshaft including crank journals, each sandwiched between one of the block-side bearing parts and associated one of the bearing caps, and rotatably supported by the block-side bearing part and the bearing cap, crank pins, each rotatably connected to a large end part of a connecting rod, which includes a connecting rod cap, and a rod-side bearing part provided on a side of a connecting rod body opposite to a piston, the connecting rod body being connected to the piston, and crank arms, each connecting one of the crank pins to associated ones of the crank journals, tubular crank journal bearing metals, each covering a circumference of one of the crank journals, and disposed between the crank journal and associated one of the block-side bearing parts, and between the crank journal and associated one of the bearing caps; and tubular crank pin bearing metals, each covering a circumference of one of the crank pins, and disposed between the crank pin and associated one of the rod-side bearing parts, and between the crank pin and associated one of the connecting rod caps. While assembled in the engine, the crank journal and crank pin bearing metals have a circular or oval inner peripheral surface as viewed in a crankshaft direction. Each of the crank journal bearing metals includes chamfers, each located at a corner between one end surface of the crank journal bearing metal in the crankshaft direction and the inner peripheral surface of the crank journal bearing metal, and a crowned portion at at least one of two portions of the inner peripheral surface, which are inside and adjacent to the chamfers in the crankshaft direction, and inclined at an angle smaller than the chamfers so that a diameter of the inner peripheral surface increases from an inside to an outside in the crankshaft direction. Each of the crank pin bearing metals includes chamfers, each located at a corner between one end surface of the crank pin bearing metal in the crankshaft direction and the inner peripheral surface of the crank pin bearing metal, and on its inner peripheral surface, no crowned portion, in which a diameter of the inner peripheral surface varies in the crankshaft direction.

This configuration reduces an increase in the sliding resistance, even if a load is applied to one of the crank pins in an explosion stroke of a combustion cycle of an engine and the load is also applied to the associated ones of the crank journals.

Specifically, the crowned portion is provided at at least one of two portions of the inner peripheral surface of each crank journal bearing metal, which are inside and adjacent to the chamfers in the crankshaft direction. The crowned portion is crowned so that the inner diameter of the crank journal bearing metal increases from the inside to the outside in the crankshaft direction. In application of a load to one of the crank pins in an explosion stroke, and the associated ones of the crank journals are inclined downward toward this crank pin, the crank journals come into contact with the crowned portions. That is, the crank journal bearing metals receive the load applied to the crank journals at the crowned portions. In other words, the crowned portions serve as surfaces for receiving the load applied to the crank journals. In this configuration, the load is not received at one point like the corner between one end surface of each crank journal bearing metal in the crankshaft direction and its inner peripheral surface, but on the surface of its crowned portion. This reduces the contact pressure on the crank journal bearing metals. This results in reduction in an increase in the sliding resistance on the crank journals in the explosion stroke.

However, each crank pin bearing metal includes, on its inner peripheral surface, no crowned portion, in which the diameter of the inner peripheral surface varies in the crankshaft direction. Each crank pin bearing metal is provided between the associated crank pin and the large end part of the associated connecting rod. In the explosion stroke, the load is applied to the crank pin bearing metal in a direction substantially perpendicular to the crankshaft direction. Thus, unless the crank pin bearing metal has an as large as possible area of the surface for receiving the load applied in the direction substantially perpendicular to the crankshaft direction, the contact pressure in the application of the load may break an oil film formed between the crank pin bearing metal and the crank pin to reduce the sliding resistance on the crank pin, which may increase the sliding resistance on the crank pin. To address the problem, the crank pin bearing metal includes only the chamfers to obtain the area of the surface for receiving the load applied in the direction substantially perpendicular to the crankshaft direction. This results in reduction in an increase in the sliding resistance on the crank pin in the explosion stroke.

In one aspect of the support structure described above, the crowned portion of each crank journal bearing metal includes crowned portions, each located at one of the two portions of the inner peripheral surface of the crank journal bearing metal, which are inside and adjacent to the chamfers in the crankshaft direction.

In general, each crank pin is located on one side of the associated crank journal in the crankshaft direction. Thus, there is a need to consider both cases, where a load is applied to one of the crank pins located on the sides of the crank journal, and where a load is applied to the other crank pin.

Thus, the crowned portion of each crank journal bearing metal includes crowned portions, each located at one of the two portions of the inner peripheral surface of the crank journal bearing metal, which are inside and adjacent to the chamfers in the crankshaft direction. Even if a load is applied to any one of the crank pins on the sides of the crank journal in the crankshaft direction, the load applied to the crank journal can be received at the crowned portion closer to the crank pin, to which the load is applied. This reliably reduces an increase in the sliding resistance on the crank journals in the explosion stroke.

Another aspect of the present invention provides a support structure for a rotary part of an engine. The structure includes block-side bearing parts in a cylinder block, bearing caps, each associated with one of the block-side bearing parts; crank journals, each sandwiched between one of the block-side bearing parts and associated one of the bearing caps, and rotatably supported by the block-side bearing part and the bearing cap, a crankshaft including crank journals, each sandwiched between one of the block-side bearing parts and associated one of the bearing caps, and rotatably supported by the block-side bearing part and the bearing cap, crank pins, each rotatably connected to a large end part of a connecting rod, which includes a connecting rod cap, and a rod-side bearing part provided on a side of a connecting rod body opposite to a piston, the connecting rod body being connected to the piston, and crank arms, each connecting one of the crank pins to associated ones of the crank journals, tubular crank journal bearing metals, each covering a circumference of one of the crank journals, and disposed between the crank journal and associated one of the block-side bearing parts, and between the crank journal and associated one of the bearing caps; and tubular crank pin bearing metals, each covering a circumference of one of the crank pins, and disposed between the crank pin and associated one of the rod-side bearing parts, and between the crank pin and associated one of the connecting rod caps. While assembled in the engine, the crank journal and crank pin bearing metals have a circular or oval inner peripheral surface as viewed in a crankshaft direction. Each of the crank journal bearing metals includes chamfers, each located at a corner between one end surface of the crank journal bearing metal in the crankshaft direction and the inner peripheral surface of the crank journal bearing metal, and a crowned portion at at least one of two portions of the inner peripheral surface, which are inside and adjacent to the chamfers in the crankshaft direction, and inclined at an angle smaller than the chamfers so that a diameter of the inner peripheral surface increases from an inside to an outside in the crankshaft direction. Each of the crank pin bearing metals includes chamfers, each located at a corner between one end surface of the crank pin bearing metal in the crankshaft direction and the inner peripheral surface of the crank pin bearing metal, and a crowned portion at at least one of two portions of the inner peripheral surface, which are inside and adjacent to the chamfers in the crankshaft direction, and inclined at an angle smaller than the chamfers so that a diameter of the inner peripheral surface increases from an inside to an outside in the crankshaft direction. The crowned portions of the crank pin bearing metals are inclined at a smaller angle than the crowned portions of the crank journal bearing metals.

In this configuration as well, each crank journal bearing metal receives the load applied to the crank journal at the crowned portions in the explosion stroke of the combustion cycle of the engine. This reduces an increase in the sliding resistance on the crank journals in the explosion stroke.

At this time, in the explosion stroke, the load is applied not in a direction perpendicular to the crank pin, but in a direction slightly inclined from the perpendicular direction. To address the problem, each crank pin bearing metal has, like the crank journal bearing metals, the crowned portion. In the explosion stroke, even if the inclined load inclines the crank pin from the crankshaft direction (along the axis of the crank pin bearing metal), the load is received at the crowned portion. In other words, the crowned portion in the inner peripheral surface of the crank pin bearing metal serves as a surface for receiving the load, when the crank pin is inclined.

In addition, the crowned portions of the crank pin bearing metals are inclined at a smaller angle than the crowned portions of the crank journal bearing metals. The crowned portions of the crank pin bearing metals are inclined from surfaces extending in the crankshaft direction at a smaller angle than the crowned portions of the crank journal bearing metals. As a result, in application of a load to one of the crank pin bearing metals, the load is also received at the crowned portion. This increases the area of the surface for receiving the load as much as possible. This also reduces an increase in the sliding resistance on the crank pin in the explosion stroke.

In the support structure according to the other aspect described above, the crowned portion of each crank journal bearing metal includes crowned portions, each located at one of the two portions of the inner peripheral surface of the crank journal bearing metal, which are inside and adjacent to the chamfers in the crankshaft direction. The crowned portion of each crank pin bearing metal includes crowned portions, each located at one of the two portions of the inner peripheral surface of the crank pin bearing metal, which are inside and adjacent to the chamfers in the crankshaft direction.

With this configuration, even if a load is applied to any one of the crank pins on the sides of the crank journal in the crankshaft direction in the explosion stroke, the load applied to the crank journal can be received at the crowned portion closer to the crank pin, to which the load is applied.

Even if the crank pin is inclined from the crankshaft direction in the explosion stroke, a load applied to the crank pin is received properly at both the crowned portions on the sides of the crank pin.

This reduces an increase in the sliding resistance on the crank pin and the crank journals in the explosion stroke more reliably.

In one preferred embodiment of the support structure described above, the crank journal bearing metals have a different length from the crank pin bearing metals in the crankshaft direction.

In general, the crank journal bearing metals and the crank pin bearing metals are made of the same material and have similar appearances. This causes erroneous attachment of these bearing metals to a cylinder block. Even if there is a difference in presence or absence of the crowned portions and in the shapes of the crowned portions, it is extremely difficult to distinguish the crank journal bearing metals from the crank pin bearing metals based on the difference.

To address the problem, the crank journal bearing metals have a different length from the crank pin bearing metals in the crankshaft direction. This facilitates the distinction of the crank journal bearing metals from the crank pin bearing metals from their appearances, thereby preventing or reducing erroneous attachment.

Advantages of the Invention

As described above, in the support structure according to the present invention, in application of a load to one of the crank pins in an explosion stroke of the combustion cycle of the engine, the associated crank journal bearing metals receive the load, which is applied to the associated crank journals, at their crowned portions. As compared to the case where the load is received at the corner between one end surface of each crank journal bearing metal in the crankshaft direction and its inner peripheral surface, the contact pressure on the crank journal bearing metals decreases. This results in reduction in an increase in the sliding resistance on the crank journals in the explosion stroke. On the other hand, each crank pin bearing metal includes no crowned portion or a crowned portion(s), which is/are inclined at a smaller angle than the crowned portions of the crank journal bearing metals. This configuration provides an as large as possible area of the surface for receiving the load applied in the direction substantially perpendicular to the crankshaft direction. This reduces an increase in the sliding resistance on the crank pin in the explosion stroke. This results in reduction in an increase in the sliding resistance on the crank pin and the associated crank journals in the explosion stroke of the combustion cycle of the engine.

DESCRIPTION OF EMBODIMENTS

Exemplary embodiments will now be described in detail with reference to the drawings.

First Exemplary Embodiment

Figure 1:
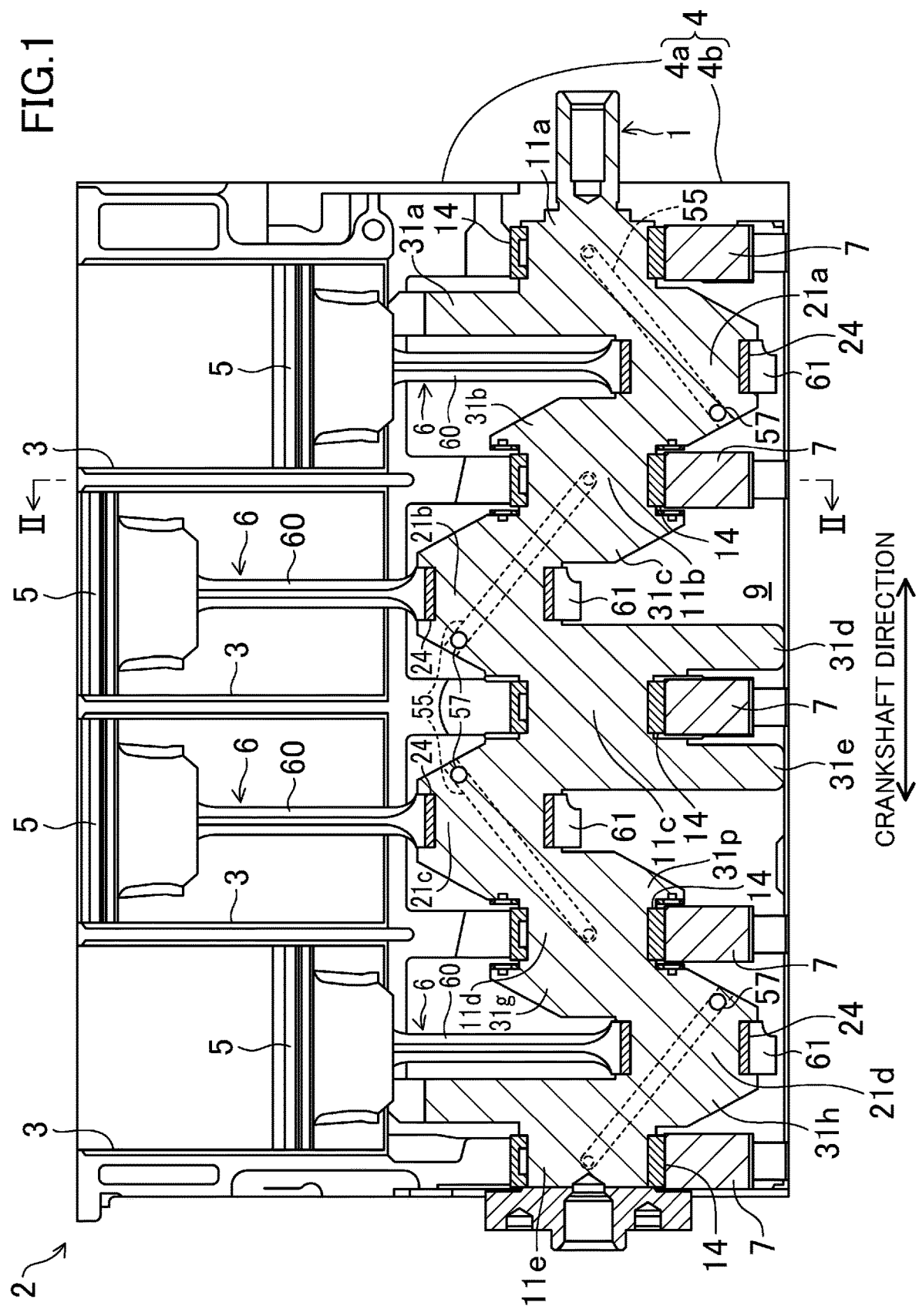
FIG. 1 is a cross-sectional view of a crankshaft of an engine including a rotary part support structure according to a first exemplary embodiment.

FIG. 1 is a cross-sectional view of a crankshaft 1 of an engine 2 including a rotary part support structure according to a first exemplary embodiment. This engine 2 is a multi-cylinder engine including cylinders 3, and mounted in a vehicle such as a motor vehicle. The crankshaft 1 extends in the vehicle longitudinal direction or in the vehicle width direction (horizontally in each case). In this exemplary embodiment, the engine 2 is an in-line four cylinder engine, in which four cylinders 3 are arranged in a line in a crankshaft direction (horizontally in FIG. 1). Although not shown, a transmission is disposed on one side (the right in FIG. 1) of the engine 2 in the direction along a cylinder bank. The output of the rotation of the crankshaft 1 is converted by the transmission to a predetermined gear ratio and transmitted to driving wheels of the vehicle.

The engine 2 is composed of a cylinder block 4, a cylinder head (not shown) assembled onto the cylinder block 4, and an oil pan (not shown) assembled under the cylinder block 4.

The cylinder block 4 includes an upper block 4a and a lower block 4b attached to the lower surface of the upper block 4a. The oil pan is attached to the lower surface of the lower block 4b.

The four cylinders 3 are arranged in a line in an upper part of the upper block 4a with a wall interposed between adjacent ones of the cylinders. Each cylinder 3 includes a piston 5 disposed therein. The piston 5 is slidably fitted into the inner peripheral surface of the cylinder 3. The piston 5 in each cylinder 3 is connected to the crankshaft 1 via a connecting rod 6.

The bottom of the upper block 4a defines the top of a crank chamber 9 which houses the crankshaft 1. The bottom of the crank chamber 9 is defined by the lower block 4b. That is, the crank chamber 9 is defined by the combination of the upper and lower blocks 4a and 4b. Parts of the crank chamber 9 communicate with each other along the cylinder bank. The crankshaft 1 is disposed in the crank chamber 9.

The crankshaft 1 includes crank journals 11 (five in FIG. 1), crank pins 21 (four in FIG. 1), and crank arms 31 (eight in FIG. 1). Each crank journal 11 is supported by the cylinder block 4 and one of bearing caps 7. Each crank pin 21 supports the large end part 6a of one of the connecting rods 6. Each crank arm 31 connects one of the crank pins 21 to associated ones of the crank journals 11. The crank pins 21 extends in the crankshaft direction (i.e., along the cylinder bank).

The crank journals 11 are arranged at equal intervals in the crankshaft direction in the crankshaft 1. Specifically, two of the five crank journals 11 are arranged on two ends of the crankshaft 1 in the crankshaft direction. The other three crank journals 11 are arranged between these crank journals 11, which are located at the ends of the crankshaft 1, at equal intervals in the crankshaft direction. While the crankshaft 1 is disposed in the crank chamber 9, two of the crank journals 11 are located at two ends of the crank chamber 9 in the direction along the cylinder bank. Each of the other crank journals 11 is located between adjacent ones of the cylinders 3. The five crank journals 11 are hereinafter referred to as a first crank journal 11a, a second crank journal 11b, a third crank journal 11c, a fourth crank journal 11d and a fifth crank journal 11e in this order from the side closer to the transmission (the right in FIG. 1) to the other side (the left in FIG. 1). If there is no need to distinguish them, they are simply referred to as a crank journal(s) 11.

Figure 2:
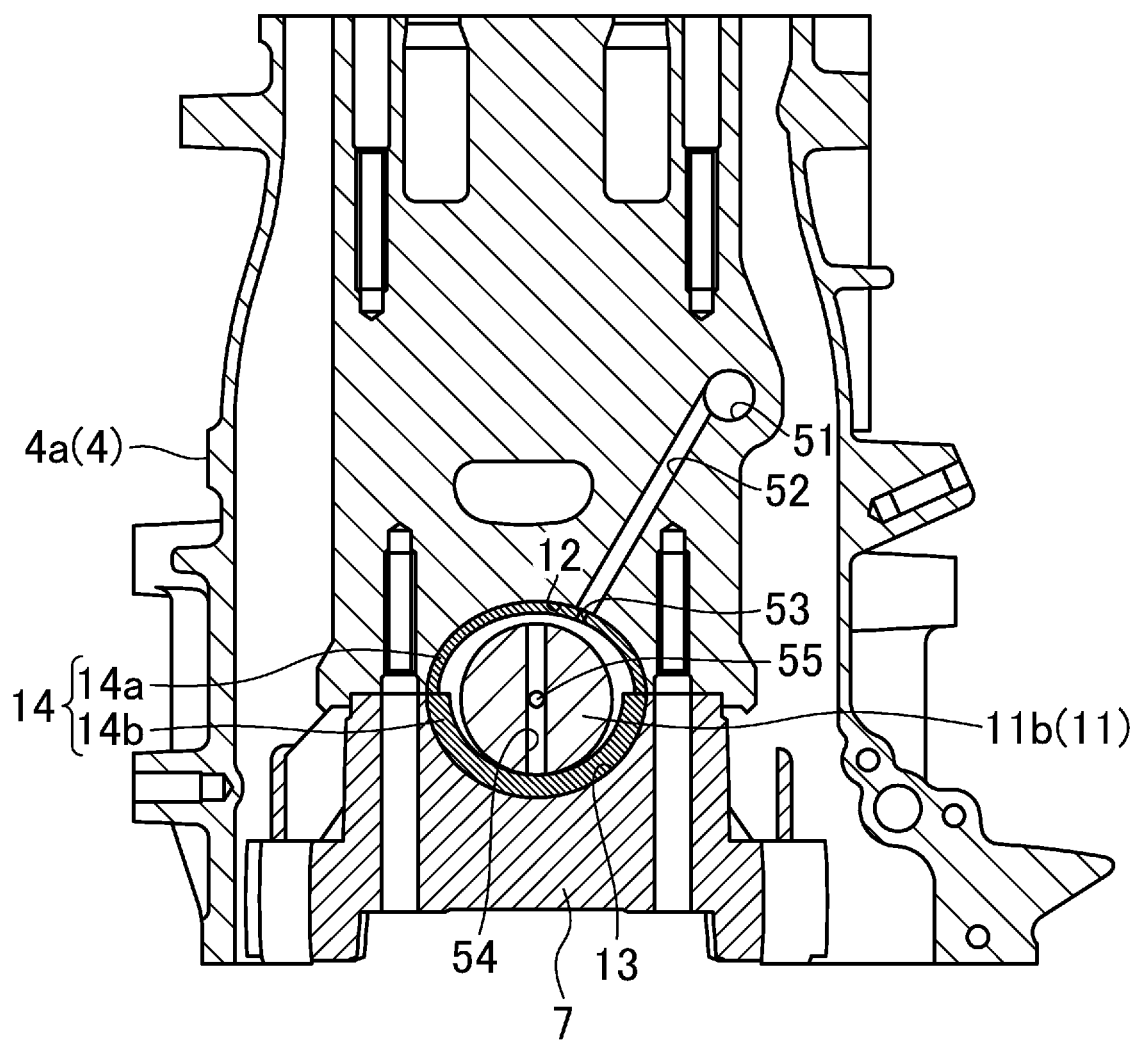
FIG. 2 is a cross-sectional view taken along the line II-II of FIG. 1.

As shown in FIG. 2, each crank journal 11 has a circular cross-section as viewed in the crankshaft direction, that is, a columnar shape as a whole. Each crank journal 11 is supported by the cylinder block 4 and one of the bearing caps 7, while being sandwiched in the vertical direction between a lower end part of the upper block 4a and the bearing cap 7 fixed to the lower end part. Specifically, (five) block-side bearing parts 12 are formed in the lower end part of the upper block 4a in positions corresponding to the five crank journals 11. The block-side bearing parts 12 are recessed upward from the lower end of the upper block 4a, and have a semielliptical shape as viewed in the crankshaft direction. The (five) bearing caps 7 are provided corresponding to the block-side bearing parts 12. Cap-side bearing parts 13 are formed in upper end parts of the respective bearing caps 7. The cap-side bearing parts 13 are recessed downward from the upper end of the associated one of the bearing caps 7, and have a semielliptical shape as viewed in the crankshaft direction. Each bearing cap 7 is fixed to the lower end part of the upper block 4a to sandwich one of the crank journals 11 between the block- and cap-side bearing parts 12 and 13. Then, each crank journal 11 is rotatably supported by a crank journal bearing metal 14. The crank journal bearing metal 14 covers the circumference of the crank journal 11. The crank journal bearing metal 14 is disposed between the crank journal 11 and one of the block-side bearing parts 12, and between the crank journal 11 and one of the bearing caps 7 (the cap-side bearing parts 13).

The crank journal bearing metal 14 is a cylindrical bearing metal formed by butting a block-side bearing metal 14a and a cap-side bearing metal 14b in a vertical direction. The block-side bearing metal 14a is attached to the associated one of the block-side bearing parts 12, and has a semi-cylindrical shape. The cap-side bearing metal 14b is attached to the associated one of the cap-side bearing parts 13, and has a semi-cylindrical shape. As shown in FIG. 2, the block- and cap-side bearing metals 14a and 14b butt against each other so that the crank journal bearing metal 14 is deformed into an elliptic cylindrical shape, which is shorter in the vertical direction, while the associated bearing cap 7 is fixed to the cylinder block 4 (i.e., the upper block 4a). While the bearing cap 7 is fixed to the cylinder block 4 in this manner, the crank journal bearing metal 14 has an oval inner peripheral surface which is shorter in the vertical direction and longer in the horizontal direction, as viewed in the crankshaft direction (in FIG. 2).

The deformation of each crank journal bearing metal 14 into the shape described above reduces the contact area between the crank journal bearing metal 14 and the crank journal 11. This is advantageous in reducing the sliding resistance on the crank journal 11. Although will be described later in detail, the block-side bearing metal 14a of each crank journal bearing metal 14 has an oil groove 15 to supply oil as a lubricant between the crank journal bearing metal 14 and the crank journal 11. One the other hand, the cap-side bearing metal 14b of each crank journal bearing metal 14 includes crowned portions 17 to receive a load applied to the crank journals 11 in an explosion stroke of a combustion cycle of the engine 2 (hereinafter simply referred to as an explosion stroke).

While disposed in the engine 2, each crank journal bearing metal 14 has an elliptic cylindrical shape. Thus, while the crank journal bearing metal 14 is arranged around the associated crank journal 11, a gap is formed between the crank journal bearing metal 14 and the crank journal 11. Although will be described later in detail, the oil, which has been supplied toward the inner peripheral surface of each crank journal bearing metal 14, spreads to the entire circumference of the crank journal 11 through the gap. The oil forms an oil film for lubricating the crank journal 11 on the inner peripheral surface of the crank journal bearing metal 14.

Each crank pin 21 is located between adjacent ones of the crank journals 11 (one of four positions) in the crankshaft 1. Each crank pin 21 is located under one of the cylinders 3, while the crankshaft 1 is disposed in the crank chamber 9. The crank pin 21 is connected to the piston 5 in the cylinder 3 via the connecting rod 6. The four crank pins 21 are hereinafter referred to as a first crank pin 21a, a second crank pin 21b, a third crank pin 21c, and a fourth crank pin 21d in this order from the side closer to the transmission (the right in FIG. 1) to the other side (the left in FIG. 1). If there is no need to distinguish them, they are simply referred to as a crank pin(s) 21.

Figure 3:
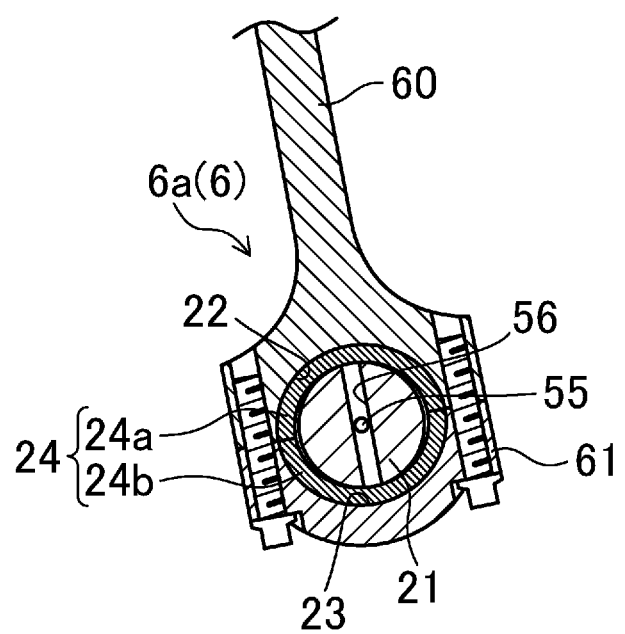
FIG. 3 is a cross-sectional view of a crank pin, a connecting rod, and a crank pin bearing metal.

As shown in FIG. 3, each crank pin 21 has a circular cross-section as viewed in the crankshaft direction, that is, a cylindrical shape as a whole. Each crank pin 21 is rotatably connected to the large end part 6a of the associated one of the connecting rods 6. Each connecting rod 6 has a small end part (not shown) connected to the piston 5 of the associated one of the cylinders 3. When the piston 5 reciprocates in the cylinder 3 in the combustion cycle of the engine 2, the crank pin 21 rotates about the axis of the crankshaft 1 (i.e., about the axes of the associated ones of the crank journals 11) in accordance with the reciprocation. That is, the reciprocation of the piston 5 is converted into the rotation of the crankshaft 1. In this exemplary embodiment, two or more cylinders 3 do not perform the explosion strokes at the same time. The cylinders 3 perform the explosion strokes sequentially. Thus, the first to fourth crank pins 21a to 21d are shifted at predetermined angles along the circumferences of the crank journals 11 to meet the times of the explosion strokes of the respective cylinders 3.

As shown in FIG. 3, each connecting rod 6 includes a connecting rod body 60 and a connecting rod cap 61 fixed to the connecting rod body 60. Specifically, the lower end part (i.e., the end part farther from the piston) of the connecting rod body 60 and the connecting rod cap 61 form the large end part 6a of the connecting rod. The large end part 6a of the connecting rod is connected to the associated one of the crank pins 21 such that the lower end part of the connecting rod body 60 and the connecting rod cap 61 sandwich the crank pin 21. Specifically, a rod-side bearing part 22 is formed in the lower end part of the connecting rod body 60. The rod-side bearing part 22 is recessed toward the small end part of the connecting rod, and has a semielliptical shape as viewed in the crankshaft direction. On the other hand, a cap-side bearing part 23 is formed in the connecting rod cap 61. The cap-side bearing part 23 is recessed from the side closer to the connecting rod body 60 to the opposite side, and has a semielliptical shape as viewed in the crankshaft direction. The connecting rod cap 61 is fixed to the connecting rod body 60 to sandwich the crank pin 21 between the rod- and cap-side bearing parts 22 and 23. Then, the large end part 6a of the connecting rod is connected to the crank pin 21 via a tubular crank pin bearing metal 24, which covers the crank pin 21. The crank pin bearing metal 24 is disposed between the crank pin 21 and the rod-side bearing part 22, and between the crank pin 21 and the connecting rod cap 61 (i.e., the cap-side bearing part 23).

The crank pin bearing metal 24 is a cylindrical bearing metal formed by butting a rod-side bearing metal 24a and a cap-side bearing metal 24b. The rod-side bearing metal 24a is attached to the associated one of the rod-side bearing parts 22, and has a semi-cylindrical shape. The cap-side bearing metal 24b is attached to the associated one of the cap-side bearing parts 23, and has a semi-cylindrical shape. As shown in FIG. 3, the rod- and cap-side bearing metals 24a and 24b butt against each other so that the crank pin bearing metal 24 is deformed into an elliptic cylindrical shape, which is shorter in the direction in which the connecting rod 6 extends, while the connecting rod cap 61 is fixed to the lower end part of the connecting rod body 60. While the connecting rod cap 61 is fixed to the connecting rod body 60 in this manner, the crank pin bearing metal 24 has an oval inner peripheral surface, which is shorter in the direction, in which the connecting rod 6 extends, and longer in the direction perpendicular to this direction, as viewed in the crankshaft direction. The deformation of each crank pin bearing metal 24 into the shape described above reduces the contact area between the crank pin bearing metal 24 and the associated crank pin 21. This is advantageous in reducing the sliding resistance on the crank pin 21.

Each crank arm 31 connects each end of the crank pins 21 to the end of the associated one of the crank journals 11, which is closer to the end of the crank pin 21, to allow the crank pin 21 to rotate about the axis of the crankshaft 1 (i.e., about the axis of the crank journal 11). For example, the crank arm 31 located on one side of the first crank pin 21a connects the end of the first crank pin 21a, which is closer to the transmission, to the end of the first crank journal 11a, which is farther from the transmission. On the other hand, the crank arm 31 located on the other side of the first crank pin 21a connects the end of the first crank pin 21a, which is farther from the transmission, to the end of the second crank journal 11b, which is closer to the transmission. The eight crank arms 31 are hereinafter referred to as a first crank arm 31a, a second crank arm 31b, a third crank arm 31c, a fourth crank arm 31d, a fifth crank arm 31e, a sixth crank arm 31p, a seventh crank arm 31g, and an eighth crank arm 31h in this order from the side closer to the transmission (the right in FIG. 1) to the other side (the left in FIG. 1). If there is no need to distinguish them, they are simply referred to as a crank arm(s) 31. Each of the first and second crank arms 31a and 31b is located on one side of the first crank pin 21a. Each of the third and fourth crank arms 31c and 31d is located on one side of the second crank pin 21b. Each of the fifth and sixth crank arms 31e and 31p is located on one side of the third crank pin 21c. Each of the seventh and eighth crank arms 31g and 31h is located on one side of the fourth crank pin 21d.

As described above, the crank arms 31 connect one of the crank pins to the associated ones of the crank journals 11 to so that the first to fourth crank pins 21a to 21d are shifted at predetermined angles along the circumferences of the crank journals 11.

As shown in FIG. 1, each of the first, third, sixth, and eighth crank arms 31a, 31c, 31p, and 31h has a crank pin communication passage 55, which will be described later.

Now, the paths for supplying oil as a lubricant to the crank journal and crank pin bearing metals 14 and 24 will be described hereinafter with reference to FIGS. 1 to 4.

Figure 4:
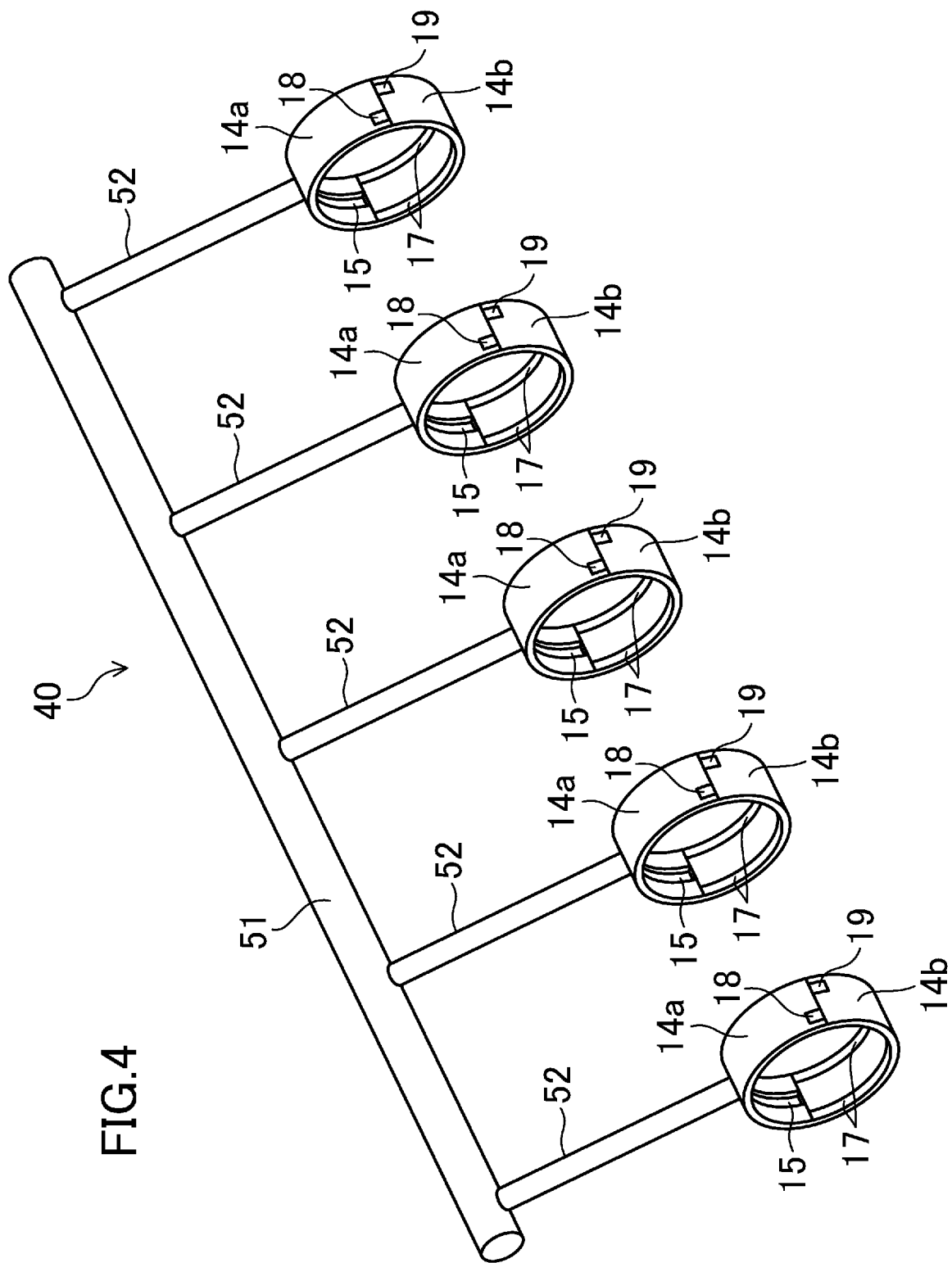
FIG. 4 is a perspective view of an oil supply passage to crank journal bearing metals.

FIG. 4 is illustrates an oil supply passage 40 for supplying the lubricant to the crank journal bearing metals 14. As also shown in FIG. 2, the oil supply passage 40 includes a main gallery 51 and five crank journal communication passages 52. The main gallery 51 extends in the cylinder block 4 along the cylinder bank. Each crank journal communication passage 52 extends in the cylinder block 4 from the main gallery 51 to one of the five bearing metals 14 to supply the oil to the crank journal bearing metal 14. The crank journal communication passages 52 are connected to the block-side bearing metals 14a of the associated crank journal bearing metals 14.

Each block-side bearing metal 14a has an oil supply hole 53 to allow the oil, which has been passed through the associated one of the crank journal communication passages 52, to the gap between the crank journal bearing metal 14 and the crank journal 11. Each block-side bearing metal 14a has, at its central portion in the crankshaft direction, the oil groove 15 extending along the entire circumference of the block-side bearing metal 14a. Each of the oil supply holes 53 communicates with the associated one of the oil grooves 15. The oil, which has flowed from the oil supply hole 53 of each block-side bearing metal 14a spreads in the oil groove 15. As described above, since there is the gap between each crank journal 11 and the crank journal bearing metal 14, the oil, which has spread in the oil groove 15, flows into the gap. The oil, which has flowed into the gap, is drawn to the rotating crank journal 11, and spreads in the entire gap between the crank journal 11 and the cap-side bearing metal 14b.

As shown in FIG. 2, the first, second, fourth, and fifth crank journals 11a, 11b, 11d, and 11e (only the second crank journal 11b is shown in FIG. 2) has a crank journal branch passage 54, which extends along the diameter of the crank journal 11. Each of these crank journal branch passages 54 receives part of the oil, which has been supplied to the associated crank journal bearing metal 14. Each crank journal branch passage 54 is connected to one of the crank pin communication passages 55 (see FIGS. 1 and 2). Each crank pin communication passage 55 extends toward the crank pin 21, which is, in the crankshaft direction, adjacent to one end of the crank journal 11 having the crank journal branch passage 54, and penetrates the crank arm 31 connecting the crank journal 11 to the crank pin 21. Each crank pin communication passage 55 serves to supply the oil, which has flowed to the associated crank journal branch passage 54, to the associated crank pin bearing metal 24.

In this exemplary embodiment, each crank pin communication passage 55 penetrates the crank arm 31 located on one side of the crank pin 21, which is, in the crankshaft direction, adjacent to one end of the crank journal 11 having the crank journal branch passage 54, from the crank journal 11. Then, after penetrating the crank pin 21 obliquely, the crank pin communication passage 55 penetrates the crank arm 31 located on the other side of the crank pin 21, and is open to the surface of the crank arm 31. The opening is sealed with a sealing member 57.

As shown in FIG. 3, each crank pin 21 has a crank pin branch passage 56h extending along the diameter of the crank pin 21. Each crank pin communication passage 55 is connected to the crank pin branch passage 56 of the associated crank pin 21. The crank pin branch passage 56 is open to two portions of the circumferential surface of the crank pin 21, which face each other along the diameter of the crank pin 21.

Oil supply, for example, from the first crank journal 11a to the first crank pin 21a will be described. First, the oil, which has been supplied to the first crank journal 11a, flows to the crank journal branch passage 54 of the first crank journal 11a. The oil, which has flowed to the crank journal branch passage 54, flows to the crank pin communication passage 55 extending from the first crank journal 11a to the first crank pin 21a, and flows through the crank pin communication passage 55. The oil flowing through the crank pin communication passage 55 passes through the crank pin branch passage 56 of the first crank pin 21a and is supplied to the gap between the first crank pin 21a and the crank pin bearing metal 24 covering the circumference of the first crank pin 21a. The oil, which has been supplied in this manner, is spread on the entire inner peripheral surface of the crank pin bearing metal 24 by the connecting rod 6 sliding on the first crank pin 21a, and forms an oil film. The oil is also supplied to the crank pin bearing metals 24 of the other second to fourth crank pins 21b to 21d and oil films are formed on the inner peripheral surfaces of the crank pins 21b to 21d.

In order to reduce the sliding resistance on the crank pins 21, an oil film with a proper thickness needs to be formed on their respective crank pin bearing metals 24. In order to form an oil film with a proper thickness, a proper pressure (amount) of oil need to be supplied. In this respect, in this exemplary embodiment, the opening of each crank pin communication passage 55 on the surface of the associated crank arm 31 is sealed with the sealing member 57. This prevents the oil flowing through the crank pin communication passage 55 from flowing out of the crankshaft 1. Filling the inside of the crank pin communication passage 55 with the oil film generates oil pressure. Therefore, supplying a proper amount of oil to the crank journal bearing metals 14 leads to formation of oil films with a proper thickness on the crank pin bearing metals 24.

In an explosion stroke, fuel combustion allows one of the pistons 5 to descend from the top dead center to the bottom dead center all at once. A load is thus applied to the crank pin 21 connected to this piston 5 via the connecting rod 6 in the direction substantially perpendicular to the crankshaft direction. In application of the load to the crank pin 21, the load is also applied to the associated crank journals 11 via the associated crank arms 31. As described above, two or more cylinders 3 do not perform the explosion strokes at the same time. In the crank journals 11, each of which is located one side of the crank pin 21 of the cylinder 3 having performed the explosion stroke, the load is received only at the positions closer to the crank pin 21. That is, the load is applied only to one sides of the crank journals 11. Thus, the crank journals 11 are inclined downward toward the crank pin 21 connected to the piston 5 of the cylinder 3 having performed the explosion stroke. In short, their crank journal bearing metals 14 receive the load from the crank journals 11 whose axes are inclined downward.

At this time, unless the crank journal bearing metals 14 properly receive the load from the crank journals 11, an excessive contact pressure is applied from the crank journals 11 to the crank journal bearing metals 14, thereby increasing the sliding resistance on the crank journals 11.

Figure 5:
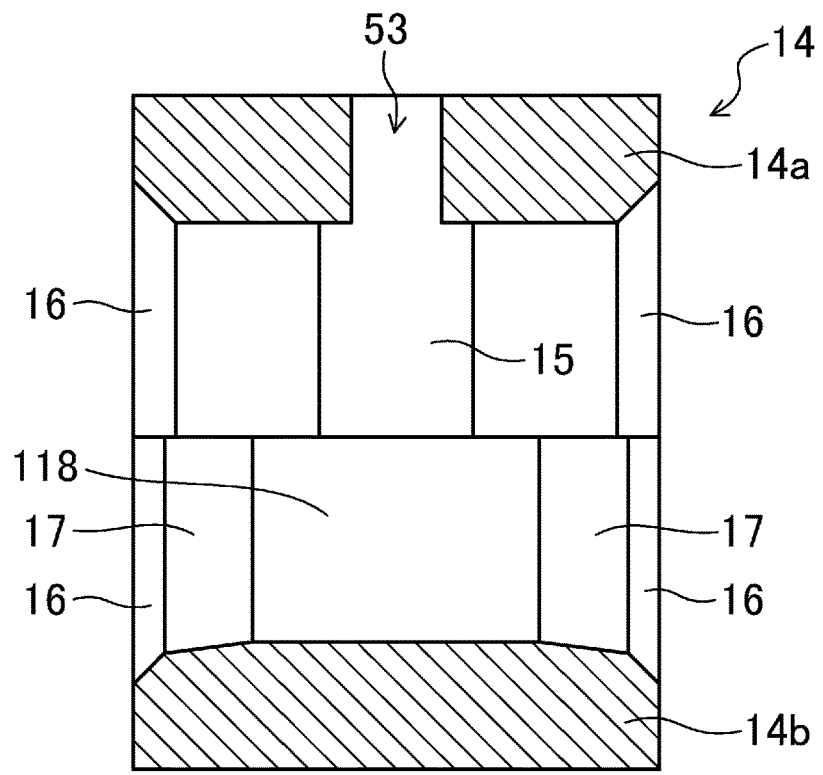
FIG. 5 is a cross-sectional view of a crank journal bearing metal taken along a plane including its axis.

To address the problem, each crank journal bearing metal 14 includes chamfers 16 and the crowned portions 17 as shown in FIG. 5 in this exemplary embodiment. Each chamfer 16 is located at the corner between one end surface of the crank journal bearing metal 14 in the crankshaft direction and the inner peripheral surface of the crank journal bearing metal 14. The crowned portions 17 are provided in two portions of the crank journal bearing metal 14 inside and adjacent to the chamfers in the crankshaft direction, which are located at the ends of the inner peripheral surface of the crank journal bearing metal 14 in the crankshaft direction. The crowned portions 17 are inclined at a smaller angle than the chamfers 16 so that the inner diameter of the crank journal bearing metal 14 increases from the inside to the outside in the crankshaft direction.

Specifically, each chamfer 16 extends along the entire circumference of the block- or cap-side bearing metal 14a or 14b at the corner between one end surface of the block- or cap-side bearing metal 14a or 14b of the crank journal bearing metal 14 in the crankshaft direction, and the inner peripheral surface of the crank journal bearing metal 14. The chamfers 16 are, for example, C-chamfers whose chamfer angle is about 45°, and have a length of about 200 μm to about 500 μm in the crankshaft and radial directions. In addition, the crowned portions 17 extend along the entire circumference of the cap-side bearing metal 14b at two portions of the cap-side bearing metal 14b inside and adjacent to the chamfers 16 in the crankshaft direction, which are located at the ends of the inner peripheral surface of the cap-side bearing metal 14b in the crankshaft direction. The crowned portions 17 are inclined at a smaller angle than the chamfers 16 so that the inner diameter of the crank journal bearing metal 14 increases from the inside to the outside in the crankshaft direction.

The crowned portions 17 are inclined at a sufficient angle to receive the load as a whole, when the crank journals 11 are inclined downward by the load. Specifically, the crowned portions 17 have a length of about 3 mm in the crankshaft direction, and are formed so that the inner diameter of the cap-side bearing metal 14b increases at maximum about 2 to about 4 μm (the amount is hereinafter referred to as an amount of crowning). That is, the crowned portions 17 are inclined at about 0.04°. This angle is one-thousandth of the tilt angle of the chamfers 16.

Formation of such crowned portions 17 has the following advantage. In application of a load to one of the crank pins 21, and the associated crank journals 11 are inclined downward toward the crank pin 21, their crank journal bearing metals 14 receive the load from the crank journals 11 at their crowned portions 17. That is, when the crank journals 11 are inclined by the load from the crank pin 21, the entire crowned portions 17 of the crank journal bearing metals 14 come into contact with the crank journals 11 via the oil films to receive the load applied on the crank journals 11. In other words, the crowned portions 17 serve as surfaces for receiving the load applied on the crank journals 11. As a result, the contact pressure on the crank journal bearing metals 14 decreases as compared to the case where each crank journal bearing metal 14 has no crowned portion 17. This results in reduction in an increase in the sliding resistance on the crank journals 11.

Figure 7:
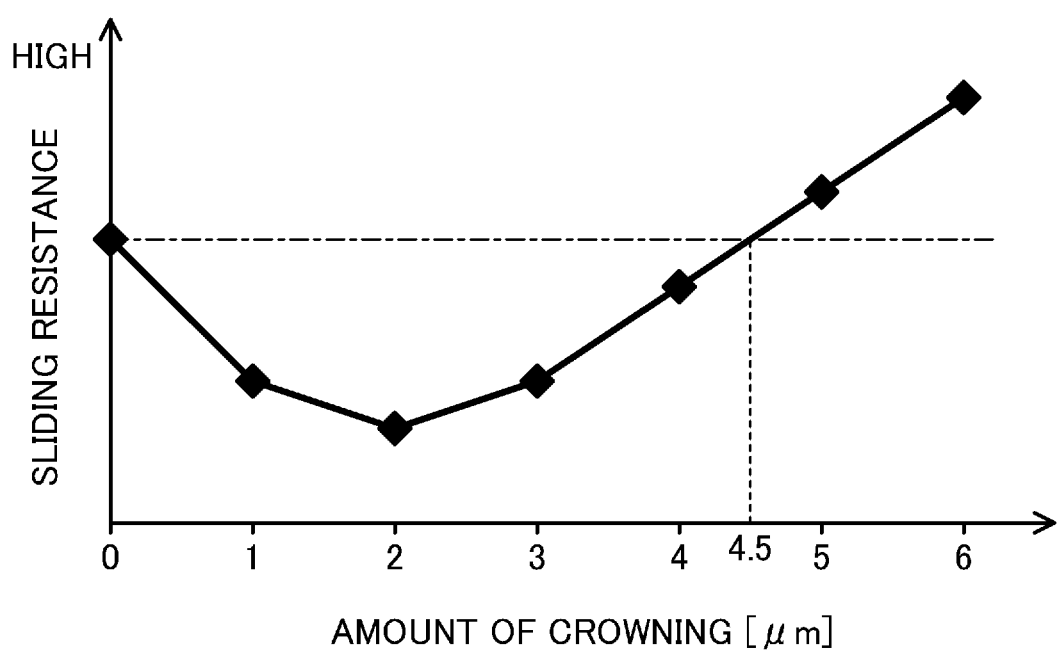
FIG. 7 is a graph showing the relation between the amount of crowning of crank journal bearing metals and the sliding resistance, which acts on crank journals adjacent to a crank pin associated with a cylinder performing an explosion stroke, in application of a load to the crank pin in the explosion stroke.

FIG. 7 illustrates the relation obtained as a result of a simulation, between the amount of crowning of the crank journal bearing metals 14 (the horizontal axis) and the sliding resistance (the vertical axis), which acts on the crank journals 11 adjacent to the crank pin 21 associated with the cylinder 3 performing an explosion stroke, in application of a load to the crank pin 21 during the explosion stroke. The crowned portions 17 of the crank journal bearing metals 14 have a length of 3 mm in the crankshaft direction.

According to FIG. 7, with an increase in the amount of crowning from zero, that is, the state in which the crowned portions 17 are unformed, the sliding resistance on the crank journals 11 decreases. This is because the formation of the crowned portions 17 reduces the contact pressure on the bearing metals 14. When the amount of crowning is 2 μm, the sliding resistance is the minimum. If the amount of crowning increases further from this state, the sliding resistance increases with the increase in the amount of crowning. The reason is as follows. An increasing amount of crowning forms an angular corner at the boundary between each crowned portion 17 and the portion of the inner peripheral surface of the cap-side bearing metal 14b, which is more inward than the crowned portion 17 in the crankshaft direction, that is, which is unprocessed and extends straight along the axis of the crank journal bearing metal 14 (hereinafter referred to as an axial extension 118). A relatively high contact pressure is applied to the angular corner in an explosion stroke. If the amount of crowning increases further, the influence of the corner between each the crowned portion 17 and the axial extension 118 increases. When the amount of crowning is larger than about 4.5 μm, the sliding resistance is higher than that when the crowned portion 17 is unformed.

In this manner, the crowned portions 17 with an amount of crowning of about 2 μm reduce an increase in the sliding resistance on the crank journals 11 in an explosion stroke.

Figure 6:
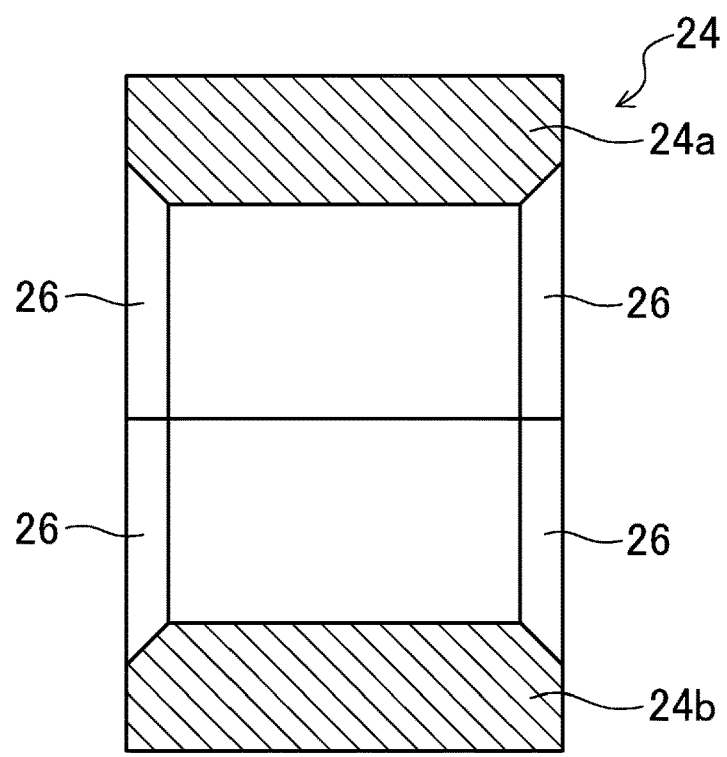
FIG. 6 is a cross-sectional view of a crank pin bearing metal taken along a plane including its axis.

In this exemplary embodiment, as shown in FIG. 6, each chamfer 26 is located at the corner between one end surface of the rod- or cap-side bearing metal 24a or 24b in the crankshaft direction and its inner peripheral surface. The chamfers 26 are inclined at the same degree as the chamfers 16. However, each crank pin bearing metal 24 includes, on its inner peripheral surface, no crowned portion, in which the diameter of the inner peripheral surface varies in the crankshaft direction.

Each crank pin bearing metal 24 is provided between one of the crank pins 21 and the associated connecting rod body 60, and between the crank pin 21 and the associated connecting rod cap 61. Thus, when one of the pistons 5 descends from the top dead center to the bottom dead center all at once in an explosion stroke, a load is applied to the crank pin bearing metal 24 associated with the piston 5 in a direction substantially perpendicular to the crankshaft direction. At this time, an as wide as possible surface is required to receive the load.

If each crank pin bearing metal 24 includes crowned portions corresponding to the crowned portions 17, the crowned portions reduce the portion of the inner peripheral surface of the crank pin bearing metal 24, which extends straight along the axis of the crank pin bearing metal 24 (the portion in which the inner peripheral surface does not vary in along the axis), that is, the area of the surface for receiving the load applied in the direction substantially perpendicular to the crankshaft direction. With a decrease in the area of the surface for receiving the load, the load applied to the crank pin 21 in an explosion stroke increases the contact pressure on the crank pin bearing metal 24. An increasing contact pressure may easily break the oil film between the crank pin bearing metal 24 and the crank pin 21. This break in the oil film may increase the sliding resistance on the crank pin 21.

To address the problem, in this exemplary embodiment, each crank pin bearing metal 24 has only the chamfers 26 and no crowned portion on its inner peripheral surface to increase the area of the surface for receiving the load applied in the direction substantially perpendicular to the crankshaft direction as much as possible not to cause a break in the oil film in an explosion stroke. This allows the crank pin bearing metal 24 to properly receive the load applied to the crank pin 21 in the explosion stroke, thereby preventing or reducing a break in the oil film of the crank pin bearing metal 24. This results in reduction in an increase in the sliding resistance on the crank pin 21 in the explosion stroke. The chamfers 26 of the crank pin bearing metals 24 are, like the chamfers 16 of the crank journal bearing metals 14, C-chamfers whose chamfer angle is about 45°, and have a length of about 200 μm to about 500 μm in the crankshaft and radial directions.

In this exemplary embodiment, the length of the crank journal bearing metals 14 in the crankshaft direction (in general, along the axes of the crank journal bearing metals 14) is different from the length of the crank pin bearing metals 24 in the crankshaft direction (i.e., along the axes of the crank pin bearing metals 24). Specifically, the length of the crank journal bearing metals 14 in the crankshaft direction (i.e., the horizontal length in FIG. 5) is longer than the length of the crank pin bearing metals 24 in the crankshaft direction (i.e., the horizontal length in FIG. 6).

The block-side bearing metals 14a of the journal bearing metals 14 are identifiable from their appearance, since each of them has the oil groove 15 at its central portion in the crankshaft direction. Having the crowned portions 17, the cap-side bearing metals 14b are, from the appearance, hardly distinguishable from the rod- and cap-side bearing metals 24a and 24b of the crank pin bearing metals 24, since the crowned portions 17 are inclined at about 0.04°. Assume that one of the cap-side bearing metals 14b is erroneously attached in place of the rod- or cap-side bearing metal 24a or 24b. When the associated crank journal 11 is inclined in an explosion stroke, a load from the crank journal 11 is received at the corner between each chamfer 26 on the inner peripheral surface of the rod- or cap-side bearing metal 24a or 24b and the portion of the rod- or cap-side bearing metal 24a or 24b more inward than the chamfer 26 in the crankshaft direction. An excessive contact pressure is applied to the corner, which increases the sliding resistance. On the other hand, each crank pin 21 includes the crowned portions 17, which reduce the area of the surface for receiving the load applied in the direction substantially perpendicular to the crankshaft direction in an explosion stroke. This may easily break the oil film in the explosion stroke, which may increase the sliding resistance. That is, no advantage of reducing an increase in the sliding resistance on the crank pin 21 and the associated crank journals 11 is obtained in the explosion stroke. Rather, the sliding resistance may increase.

To address the problem, the crank journal bearing metals 14 have a longer length (size) than the crank pin bearing metals 24 in the crankshaft direction. This makes the crank journal bearing metals 14, particularly the cap-side bearing metals 14b, from their appearances, distinguishable from the crank pin bearing metals 24, particularly the rod- and cap-side bearing metals 24a and 24b, to prevent or reduce erroneous attachment of the bearing metals.

A manufacturing method of the crank journal and crank pin bearing metals 14 and 24 will now be described.

First, a metal plate made of, for example, an iron alloy and processed in a band is press-cut into a predetermined shape. Then, the cut metal plate is bent by pressing into a semi-cylindrical shape. In the press-cutting, each block-side bearing metal 14a with the semi-cylindrical shape includes, at one circumferential end, a projection 18 (see FIG. 4) projecting outward along the circumference of the block-side bearing metal 14a. Similarly, each cap-side bearing metal 14b includes a projection 19 (see FIG. 4). These projections 18 and 19 are used for alignment when the block- and cap-side bearing metals 14a and 14b butt against each other. Each projection 19 is formed in a position axially shifted from the projection 18 of the associated block-side bearing metal 14a when the block- and cap-side bearing metals 14a and 14b butt against each other. The portion of each block-side bearing metal 14a corresponding to (butting against) the associated projection 19 is cut out to receive the projection 19 to be fitted therein. The portion of each cap-side bearing metal 14b corresponding to (butting against) the associated projection 18 is cut out to receive the projection 18 to be fitted therein. Although not shown, each of the rod- and cap-side bearing metals 24a and 24b also has a projection similar to the projections 18 and 19, and a portion cut out to receive the associated projection.

After that, chamfering is performed to cut the corner between each axial end surface and the inner peripheral surface of the metal plate bent in the semi-cylindrical shape. At this time, this chamfering is, for example, C-chamfering for forming chamfers at a chamfer angle of about 45° with a length of about 200 µm to 500 µm in the axial and radial directions. As a result, each of the metal plates bent in the semi-cylindrical shape has the chamfers 16 (or 26).

After the chamfering, the block- and cap-side bearing metals 14a and 14b are manufactured in a different manner from the rod- and cap-side bearing metals 24a and 24b.

First, the block-side bearing metals 14a will be described.

After the end of chamfering, the oil supply hole 53 is formed in each block-side bearing metal 14a at the center along its axis and at a predetermined portion along its circumference using, for example, a drill.

After the formation of the oil supply holes 53, the oil grooves 15 are formed. Each oil groove 15 extends in the axial center along the entire circumference of one of the block-side bearing metals 14a to pass through the associated one of the oil supply holes 53.

After the formation of the oil grooves 15, the entire surfaces of the block-side bearing metals 14a are plated as surface processing. As a result, the block-side bearing metals 14a are complete. However, the block-side bearing metals 14a are not necessarily plated.

Next, the cap-side bearing metals 14b will be described.

After the end of chamfering, each cap-side bearing metal 14b is crowned to form the crowned portions 17. This crowning is performed by fixing the cap-side bearing metal 14b to a predetermined jig, and then cutting two portions of the cap-side bearing metal 14b, which are axially inside and adjacent to the chamfers 16, which are formed at the axial ends of the inner peripheral surface of the cap-side bearing metal 14b. The amount of crowning is about 2 µm.

After the crowning, the entire surfaces of the cap-side bearing metals 14b are plated as surface processing. As a result, the cap-side bearing metals 14b are complete. However, the cap-side bearing metals 14b are not necessarily plated.

At the end of the chamfering, the rod- and cap-side bearing metals 24a and 24b are complete. The entire surfaces of the rod- and cap-side bearing metals 24a and 24b may be plated like the block- and cap-side bearing metals 14a and 14b.

Each journal bearing metal 14 is attached to the crankshaft 1 in a position corresponding to the associated one of the crank journals 11 as follows. First, one of the block-side bearing metals 14a is attached to one of the block-side bearing parts 12, while one of the cap-side bearing metals 14b is attached to one of the cap-side bearing parts 13. Then, one of the bearing caps 7 is attached to the upper block 4a such that the lower end part of the upper block 4a and the bearing cap 7 sandwich one of the crank journals 11. At this time, the bearing cap 7 is attached, while the block- and cap-side bearing metals 14a and 14b are aligned such that the ends of the block- and cap-side bearing metals 14a and 14b along their circumferences butt against each other. At this time, the block- and cap-side bearing metals 14a and 14b press each other to deform the crank journal bearing metal 14 into the elliptic cylindrical shape as shown in FIG. 2. With the completion of the attachment of the bearing caps 7, the attachment of the crank journal bearing metals 14 is complete.

Each crank pin bearing metal 24 is attached to the crankshaft 1 in a position corresponding to one of the crank pins 21 as follows. First, one of the rod-side bearing metals 24a is attached to one of the rod-side bearing parts 22, while one of the cap-side bearing metals 24b is attached to one of the cap-side bearing parts 23. One of the connecting rod caps 61 is attached to the lower end part of one of the connecting rod bodies 60 such that the lower end part of the connecting rod body 60 and the connecting rod cap 61 sandwich one of the crank pins 21 of the crankshaft 1. At this time, the cap 61 is attached, while the rod- and cap-side bearing metals 24a and 24b are aligned such that the ends of the rod- and cap-side bearing metals 24a and 24b along their circumferences butt against each other. After that, the cap 61 is fixed with bolts. At this time, the rod- and cap-side bearing metals 24a and 24b press each other to deform the crank pin bearing metal 24 into the elliptic cylindrical shape as shown in FIG. 3. With the completion of the attachment of the caps 61, the attachment of the crank pin bearing metals 24 is complete.

According to this exemplary embodiment, each journal bearing metal 14 includes the chamfers 16, each being located at a corner between one end surface of the crank journal bearing metal 14 in the crankshaft direction and the inner peripheral surface of the crank journal bearing metal 14, and the crowned portions 17 at two portions of the inner peripheral surface of the crank journal bearing metal 14, which are inside the chamfers 16 in the crankshaft direction. The crowned portions 17 are inclined at a smaller angle than the chamfers 16 so that the inner diameter of the crank journal bearing metal 14 increases from the inside to the outside in the crankshaft direction. This allows the crank journal bearing metal 14 to receive the load, which is input to the crank journal 11 in an explosion stroke, at the crowned portions 17. As a result, the contact pressure on the crank journal bearing metal 14 decreases as compared to the case where the crank journal bearing metal 14 has no crowned portion 17. This results in reduction in an increase in the sliding resistance on the crank journal 11 in the explosion stroke. One the other hand, each crank pin bearing metal 24 includes only the chamfers 26 and no crowned portion. This allows the crank pin bearing metal 24 to obtain the area of the surface for receiving the load applied in the direction substantially perpendicular to the crankshaft direction in the explosion stroke. This results in reduction in an increase in the sliding resistance on the crank pin 21 in the explosion stroke. As a result, an increase in the sliding resistance on the crank pin 21 and the associated crank journals 11 is reduced in the explosion stroke.

Second Exemplary Embodiment

Figure 8:
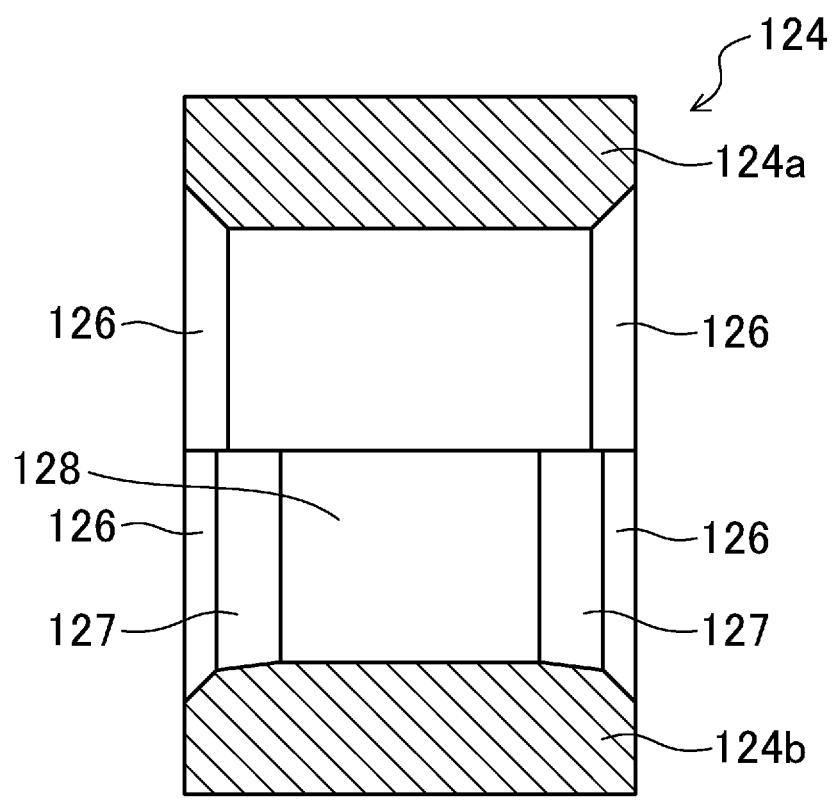
FIG. 8 corresponds to FIG. 6 and illustrates a crank pin bearing metal according to a second exemplary embodiment.

FIG. 8 illustrates each of crank pin bearing metals 124 according to a second exemplary embodiment. The crank pin bearing metal 124 is formed by butting a rod-side bearing metal 124a and a cap-side bearing metal 124b. The second exemplary embodiment is different from the first exemplary embodiment only in the configurations of the crank pin bearing metals 124. The other configurations are the same or similar to those in the first exemplary embodiment. Detailed explanation thereof will be thus omitted.

In the first exemplary embodiment, each crank pin bearing metal 24 includes no crowned portion. In this exemplary embodiment, each crank pin bearing metal 124 includes chamfers 126 similar to the chamfers 26 of the first exemplary embodiment and inclined at the same degree as the chamfers 16. In addition, the crank pin bearing metal 124 includes crowned portions 127 at two portions of the inner peripheral surface of the crank pin bearing metal 124 (particularly the cap-side bearing metal 124b) more inward than the chamfers 126 in the crankshaft direction. The crowned portions 127 are inclined at a smaller angle than the chamfers 126 so that the inner diameter of the crank pin bearing metal 124 increases from the inside to the outside in the crankshaft direction. The crowned portions 127 are inclined at a sufficient angle to properly receive a crank pin 21, in application of a load to the crank pin 21 in an explosion stroke, specifically, at a smaller angle than the crowned portions 17 of the crank journal bearing metals 14. More specifically, the amount of crowning at the crowned portions 127 (i.e., the maximum amount of the inner diameter of the crank journal bearing metal 124 increased by the formation of the crowned portions 127) is half or less of the amount of crowning at the crowned portions 17.

As described in the second exemplary embodiment, a load is applied to each crank pin bearing metal 24 basically in a direction perpendicular to the crankshaft direction in an explosion stroke. At this time, the load might be applied in a direction slightly inclined from the perpendicular direction. If the load is applied in an inclined direction, the associated crank pin 21 slides in the crank pin bearing metal 24 while being inclined from the crank pin bearing metal 24. In this case, the load is received at the corner between each chamfer 26 on the inner peripheral surface of the crank pin bearing metal 24 and the portion of the inner peripheral surface of the crank pin bearing metal 24 more inward than the chamfer 26 in the crankshaft direction. As a result, the sliding area decreases as compared to the case where the load is received at the portion of the inner peripheral surface of the crank pin bearing metal 24, which extends straight along the axis of the crank pin bearing metal 24. This may increase the sliding resistance on the crank pin 21. To address the problem, each crank pin bearing metal 124 includes the crowned portions 127 to properly receive the crank pin 21, while reducing an increase in the sliding resistance, even if the load to the crank pin 21 is inclined as described above.

If each crank pin bearing metal 124 has the crowned portions 127 as in the first exemplary embodiment, the area of an axial extension 128, which is the portion of the inner peripheral surface of the crank pin bearing metal 124 extending straight along the axis of the crank pin bearing metal 124, decreases. When the load is input to the crank pin bearing metal 124 vertically from the associated crank pin 21 in an explosion stroke, the contact pressure of the load on the crank pin bearing metal 124 increases to break the oil film of the crank pin bearing metal 124. This respect will now be described with reference to FIG. 9.

Figure 9:
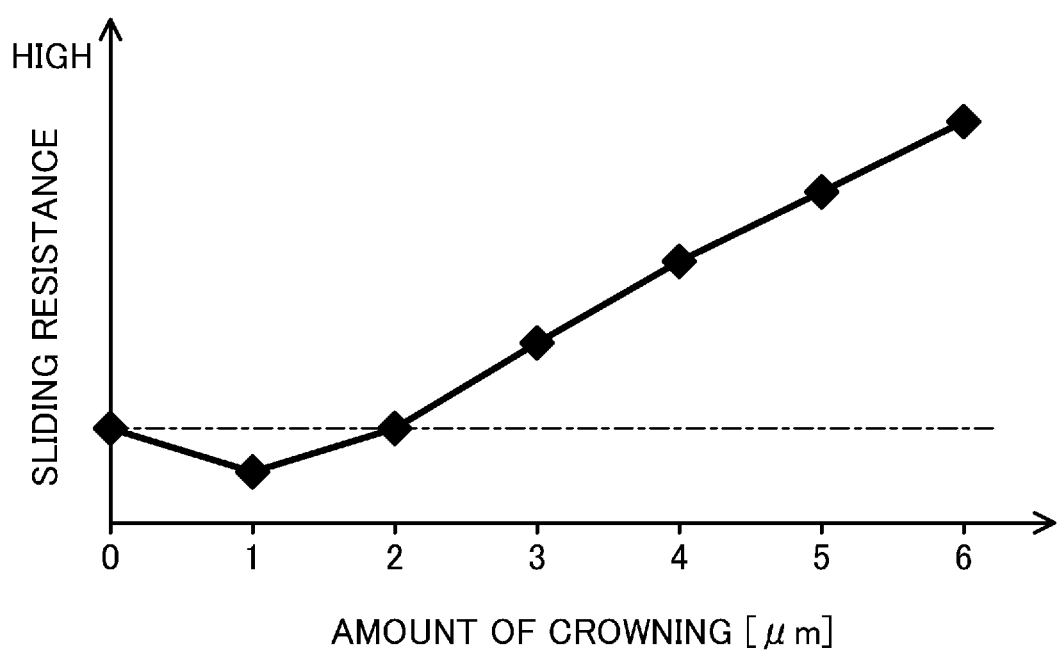
FIG. 9 is a graph showing the relation in the second exemplary embodiment between the amount of crowning of a crank pin bearing metal and the sliding resistance, which acts on a crank pin associated with a cylinder performing an explosion stroke, in application of a load to the crank pin in the explosion stroke.

FIG. 9 illustrates the relation obtained as a result of a simulation, between the amount of crowning at the crowned portions 127 (the horizontal axis) and the sliding resistance (the vertical axis), which acts on the crank pin 21 associated with the cylinder 3 performing an explosion stroke in application of a load to the crank pin 21 during the explosion stroke. The crowned portions 127 have a length of 3 mm in the crankshaft direction.

According to FIG. 9, with an increase in the amount of crowning from zero that is, the state in which the crowned portions 127 are unformed, the sliding resistance on the crank pin 21 decreases. This is because, the crowned portions 127 properly receive the crank pin 21 even if the load is inclined to the crank pin 21 as described above. When the amount of crowning is 1 µm, the sliding resistance is the minimum. If the amount of crowning increases further from this state, the sliding resistance increases with the increase in the amount of crowning. This is because the crowned portions 127 are inclined at about 0.02° when the amount of crowning is about 1 µm, and the crowned portions 127 are regarded as the same as the axial extension 128. As a result, the crowned portions 127 also receive the load applied in the direction perpendicular to the crankshaft direction, thereby preventing the contact pressure of the load from increasing to break the oil film. If the amount of crowning increases further beyond 1 µm, the crowned portions 127 are inclined too much to receive a load applied in the direction perpendicular to the crankshaft direction. Specifically, the load is received only at the axial extension 128 with a reduced area, and the oil film on the crank pin bearing metal 124 is more likely to break. When the amount of crowning is larger than 2 µm, the sliding resistance on the crank pin 21 becomes higher than in the case without the crowned portion 127. This is because the contact pressure of the load applied in the direction perpendicular to the crankshaft direction breaks the oil film on the crank pin bearing metal 124 at the crowned portions 127, when the amount of crowning is larger than about 2 µm.

In this manner, if the amount of crowning at the crowned portions 127 is smaller than that at the crowned portions 17, specifically, about half of that of the crowned portions 17 (about 1 µm), the oil film on the crank pin bearing metal 124 is less likely to break. This results in reduction in an increase in the sliding resistance on the crank pin 21 in an explosion stroke.

This reduces an increase in the sliding resistance not only on the crank journals 11 but also on the crank pin 21 more reliably.

In this exemplary embodiment as well, the crank journal bearing metals 14 have a longer length than the crank pin bearing metals 24 in the crankshaft direction.

In the first exemplary embodiment, each of the crank journal bearing metals 14 and the crank pin bearing metals 124 has the crowned portions 17 or 127. Thus, the crank journal bearing metals 14 are hardly distinguishable from the crank pin bearing metals 124 as compared to the first exemplary embodiment. To address the problem, the crank journal bearing metals 14 have a longer length than the crank pin bearing metals 124 in the crankshaft direction. This prevent or reduce erroneous attachment of the bearing metals 14 in place of the crank pin bearing metals 124, and vice versa.

The cap-side bearing metal 124b of each crank pin bearing metal 124 is manufactured similarly to the cap-side bearing metal 14b of each journal bearing metal 14 described in the first exemplary embodiment. However, the amount of crowning is about 1 µm.

In other respects, for example, the crank pin bearing metals 124 are attached to the crank pins 21 in a manner similar to those in the first exemplary embodiment.

In this exemplary embodiment, each crank pin bearing metal 124 includes the chamfers 126, and the crowned portions 127 inclined at a smaller angle than the chamfers 126. The crowned portions 127 are inclined at a smaller angle than the crowned portions 17. Thus, this embodiment provides the same or similar advantages as the first exemplary embodiment, and reduces an increase in the sliding resistance on the crank pin 21 in an explosion stroke.

The present invention is not limited to the exemplary embodiment described above. Any replacement may be made within the scope of the claims.

For example, in the exemplary embodiments, each crank journal bearing metal 14 includes the crowned portions 17 at both the two portions of its inner peripheral surface, which are located inside and adjacent to the chamfers 16 in the crankshaft direction. The present disclosure is not limited thereto. Each crank journal bearing metal 14 may include a crowned portion 17 at only one of the two portions. This is also applicable to the crank pin bearing metals 124. In particular, the first crank journal 11a receives a load only on the side closer to the first crank pin 21a. The fifth crank journal 11e receives a load only on the side closer to the fourth crank pin 21d. Thus, each of the crank journal bearing metals 14 for the first and fifth crank journals 11a and 11e may include the crowned portion 17 only on the side, to which the load is applied. Precise processing is required for the crowned portions. Thus, a decrease in the number of the crowned portions facilitates the manufacturing of the crank journal and crank pin bearing metals 14 and 24. This also reduces processing costs for forming the crowned portions.

In the exemplary embodiments described above, only the cap-side bearing metals 14b and 124b, which are the lower bearing metals of the crank journal and crank pin bearing metals 14 and 124, include the crowned portions 17 and 127, respectively. The present disclosure is not limited thereto. The block- and rod-side bearing metals 14a and 24a, which are the upper bearing metals, may also include crowned portions. In this case, the crowned portions of the block-rod-side bearing metals 14a and 124a are located, like the crowned portions 17 and 127 of the cap-side bearing metals 14b and 24b, in one or both of two portions of their inner peripheral surfaces, which are inside and adjacent to the chamfers 16 and 26 in the crankshaft direction, respectively. This reduces an increase in the sliding resistance on each crank pin 21 and the associated crank journals 11 in an explosion stroke more reliably.

In the exemplary embodiments described above, the crank journal bearing metals 14 have a longer length than the crank pin bearing metals 24 (124) in the crankshaft direction. The present disclosure is not limited thereto. the crank pin bearing metals 24 (124) may have a longer length than the crank journal bearing metals 14 in the crankshaft direction. If the crank journal bearing metals 14 are distinguished from the crank pin bearing metals 24 (124) by a method other than the use of different lengths, the crank journal bearing metals 14 have the same length as the crank pin bearing metals 24 (124) in the crankshaft direction.

In the exemplary embodiments described above, the crank journal bearing metals 14 have an cylindrical shape while not disposed in the engine 2, and are deformed into an elliptic cylindrical shape while disposed in the engine 2. The present disclosure is not limited thereto. The crank journal bearing metals 14 may also have an cylindrical shape while disposed in the engine 2, or an elliptic cylindrical shape while disposed or not disposed in the engine 2. This is also applicable to the crank pin bearing metals (24) 124.

As long as each of the crank journal and crank pin bearing metals 14 and 24 (12) has a circular or oval inner peripheral surface as viewed in a crankshaft direction, their outer peripheral surfaces may have any shape.

The embodiments described above are mere examples, and are not to be construed as limiting the scope of the present invention. The scope of the present invention should be defined by the appended claims, and all the modifications and changes which fall within the scope of equivalents of the appended claims are within the scope of the present invention.

INDUSTRIAL APPLICABILITY

The present invention is useful as a support structure for a rotary part of an engine, including crank journals, crank pins, each rotatably connected to the large end part of one of connecting rods, and crank arms, each connecting one of the crank pins to associated ones of the crank journals.

DESCRIPTION OF REFERENCE CHARACTERS

1 Crankshaft
2 Engine

4 Cylinder Block
5 Piston
6 Connecting Rod
6a Large End Part of Connecting Rod
7 Bearing Cap
11 Crank Journal
12 Block-Side Bearing Part
14 Crank Journal Bearing Metal
16 Chamfer of Crank Journal Bearing Metal
17 Crowned Portion of Crank Journal Bearing Metal
21 Crank Pin
22 Rod-Side Bearing Part
24 Crank Pin Bearing Metal
26 Chamfer of Crank Pin Bearing Metal
31 Crank Arm
60 Connecting Rod Body
61 Connecting Rod Cap
124 Crank Pin Bearing Metal
127 Crowned Portion of Crank Pin Bearing Metal

The invention claimed is:

1. A support structure for a rotary part of an engine, the structure comprising:
block-side bearing parts in a cylinder block;
bearing caps, each associated with one of the block-side bearing parts;
a crankshaft including;
  crank journals, each sandwiched between one of the block-side bearing parts and associated one of the bearing caps, and rotatably supported by the block-side bearing part and the bearing cap,
  crank pins, each rotatably connected to a large end part of a connecting rod, which includes a connecting rod cap, and a rod-side bearing part provided on a side of a connecting rod body opposite to a piston, the connecting rod body being connected to the piston, and
  crank arms, each connecting one of the crank pins to associated ones of the crank journals;
tubular crank journal bearing metals, each covering a circumference of one of the crank journals, and disposed between the crank journal and associated one of the block-side bearing parts, and between the crank journal and associated one of the bearing caps; and
tubular crank pin bearing metals, each covering a circumference of one of the crank pins, and disposed between the crank pin and associated one of the rod-side bearing parts, and between the crank pin and associated one of the connecting rod caps, wherein
while assembled in the engine, the crank journal and crank pin bearing metals have a circular or oval inner peripheral surface as viewed in a crankshaft direction,
each of the crank journal bearing metals includes;
  chamfers, each located at a corner between one end surface of the crank journal bearing metal in the crankshaft direction and the inner peripheral surface of the crank journal bearing metal, and
  a crowned portion at at least one of two portions of the inner peripheral surface, which are inside and adjacent to the chamfers in the crankshaft direction, and inclined at an angle smaller than the chamfers so that a diameter of the inner peripheral surface increases from an inside to an outside in the crankshaft direction,
each of the crank pin bearing metals includes;
  chamfers, each located at a corner between one end surface of the crank pin bearing metal in the crankshaft direction and the inner peripheral surface of the crank pin bearing metal, and
  on its inner peripheral surface, no crowned portion, in which a diameter of the inner peripheral surface varies in the crankshaft direction, and
the crowned portion of each crank journal bearing metal includes crowned portions, each located at one of the two portions of the inner peripheral surface of the crank journal bearing metal, which are inside and adjacent to the chamfers in the crankshaft direction.

2. The support structure of claim 1, wherein
The crank journal bearing metals have a different length from the crank pin bearing metals in the crankshaft direction.

3. A support structure for a rotary part of an engine, the structure comprising:
block-side bearing parts in a cylinder block;
bearing caps, each associated with one of the block-side bearing parts;
a crankshaft including;
  crank journals, each sandwiched between one of the block-side bearing parts and associated one of the bearing caps, and rotatably supported by the block-side bearing part and the bearing cap,
  crank pins, each rotatably connected to a large end part of a connecting rod, which includes a connecting rod cap, and a rod-side bearing part provided on a side of a connecting rod body opposite to a piston, the connecting rod body being connected to the piston, and
  crank arms, each connecting one of the crank pins to associated ones of the crank journals;
tubular crank journal bearing metals, each covering a circumference of one of the crank journals, and disposed between the crank journal and associated one of the block-side bearing parts, and between the crank journal and associated one of the bearing caps; and
tubular crank pin bearing metals, each covering a circumference of one of the crank pins, and disposed between the crank pin and associated one of the rod-side bearing parts, and between the crank pin and associated one of the connecting rod caps, wherein
while assembled in the engine, the crank journal and crank pin bearing metals have a circular or oval inner peripheral surface as viewed in a crankshaft direction,
each of the crank journal bearing metals includes;
  chamfers, each located at a corner between one end surface of the crank journal bearing metal in the crankshaft direction and the inner peripheral surface of the crank journal bearing metal, and
  a crowned portion at at least one of two portions of the inner peripheral surface, which are inside and adjacent to the chamfers in the crankshaft direction, and inclined at an angle smaller than the chamfers so that a diameter of the inner peripheral surface increases from an inside to an outside in the crankshaft direction,
each of the crank pin bearing metals includes;
  chamfers, each located at a corner between one end surface of the crank pin bearing metal in the crankshaft direction and the inner peripheral surface of the crank pin bearing metal, and
  on its inner peripheral surface, no crowned portion, in which a diameter of the inner peripheral surface varies in the crankshaft direction, and the crank journal bearing metals have a different length from the crank pin bearing metals in the crankshaft direction.

\* \* \* \* \*